United States Patent
Yardley et al.

(10) Patent No.: US 12,553,948 B2
(45) Date of Patent: Feb. 17, 2026

(54) STORAGE TESTING DEVICE FOR TESTING A STORAGE SYSTEM

(71) Applicant: INTERNATIONAL BUSINESS MACHINES CORPORATION, Armonk, NY (US)

(72) Inventors: Brent William Yardley, Hillsboro, OR (US); Adrian Philip Glover, Katy, TX (US); Shahar Mualem-Yosi, Tel-Aviv (IL); Karl Stathakis, Owatonna, MN (US); Leif Erik Laerum, Katy, TX (US); Kunjan Dedhia, Richmond, TX (US); Tom Liebsch, Arlington, SD (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 18/192,314

(22) Filed: Mar. 29, 2023

(65) Prior Publication Data

US 2024/0329137 A1  Oct. 3, 2024

(51) Int. Cl.
*G01R 31/319* (2006.01)
*G01R 31/3177* (2006.01)

(52) U.S. Cl.
CPC ... *G01R 31/31907* (2013.01); *G01R 31/3177* (2013.01); *G01R 31/31905* (2013.01)

(58) Field of Classification Search
CPC .......... G01R 31/31907; G01R 31/3177; G01R 31/31905
See application file for complete search history.

(56) References Cited

U.S. PATENT DOCUMENTS

| | | | |
|---|---|---|---|
| 6,480,799 B2 | 11/2002 | Hunter | |
| 9,477,277 B2 | 10/2016 | Coq et al. | |
| 10,670,651 B2 | 6/2020 | Wolff | |
| 10,948,540 B2 | 3/2021 | Hobbs et al. | |
| 11,009,550 B2 | 5/2021 | Champoux et al. | |
| 11,175,336 B2 | 11/2021 | Chang | |
| 11,175,708 B2 | 11/2021 | Thomas et al. | |
| 12,039,889 B1* | 7/2024 | Shasha | G09B 19/003 |
| 2002/0032537 A1 | 3/2002 | Hunter | |
| 2014/0372066 A1 | 12/2014 | Coq et al. | |
| 2017/0345455 A1* | 11/2017 | Shen | G06F 11/3058 |
| 2018/0018002 A1 | 1/2018 | Thomas et al. | |
| 2018/0156552 A1* | 6/2018 | Tu | G01M 99/002 |
| 2018/0196103 A1 | 7/2018 | Champoux et al. | |

(Continued)

OTHER PUBLICATIONS

U.S. Appl. No. 18/192,301, filed Mar. 29, 2023.
List of Patents or Patent Applications Treated as Related, 2 pp., dated Mar. 29, 2023.

*Primary Examiner* — Mark D Featherstone
*Assistant Examiner* — Rong Tang
(74) *Attorney, Agent, or Firm* — Konrad, Raynes, Davda & Victor LLP; David Victor

(57) ABSTRACT

Provided are a storage testing device, system, and method for testing a storage system. A storage testing device fits into a slot of a storage system including a controller. The storage testing device includes a resistor load bank to generate a thermal load during operation when the storage testing device is positioned in the slot. The generated thermal load is transferred to the slot. At least one sensor generates a measurement of the thermal load to provide to the controller.

19 Claims, 6 Drawing Sheets

(56) References Cited

U.S. PATENT DOCUMENTS

| | | |
|---|---|---|
| 2018/0259573 A1 | 9/2018 | Wolff |
| 2020/0033409 A1 | 1/2020 | Hobbs et al. |
| 2021/0302501 A1 | 9/2021 | Su et al. |
| 2024/0028437 A1* | 1/2024 | Patel .................... G06F 11/076 |
| 2024/0118736 A1* | 4/2024 | Hassan ................ G06F 1/3275 |

* cited by examiner

STORAGE TESTING DEVICE FOR TESTING A STORAGE SYSTEM

BACKGROUND OF THE INVENTION

1. Field of the Invention

Provided are a storage testing device, system, and method for testing a storage system.

2. Description of the Related Art

In the current art, to test an enclosure design of a disk storage array having numerous slots for hard disk drives or Solid State Drives (SSDs), the developer typically uses storage drives that are the most expensive, have the largest capacity, and can place the largest load on the storage array. The developer may then run a constant stream of I/O traffic toward the storage drives in slots of the storage array to test the functionality and durability of the storage array. Further, given the long duration of the tests, SSDs may have to be replaced during the testing because the SSDs experience wear leveling where the storage elements are no longer usable after an extended period of use.

There is a need in the art for improved and less expensive techniques for testing a storage array design.

SUMMARY

Provided are a storage testing device, system, and method for testing a storage system. A storage testing device fits into a slot of a storage system including a controller. The storage testing device includes a resistor load bank to generate a thermal load during operation when the storage testing device is positioned in the slot. The generated thermal load is transferred to the slot. At least one sensor generates a measurement of the thermal load to provide to the controller.

DETAILED DESCRIPTION

Currently, to test a storage array having numerous slots for storage disks, such as SSDs and hard disk drives, the developer of a storage array has to purchase or obtain numerous storage disks to insert in the slots of the storage array and then run Input/Output (I/O) load test patterns to test the performance of the SSD devices in the slots. This can be very expensive because enterprise level SSDs can cost several hundred dollars each. Further, during extensive testing over days, SSD drives may have to be replaced due to wear leveling.

Described embodiments provide improved technology for testing storage arrays with a testing storage device that simulates a real SSD or hard disk drive, but is substantially less expensive because it does not include storage elements, such as NAND elements. The storage testing device includes a resistor load bank to draw energy from the storage testing device and produce thermal power to simulate the thermal load produced by real storage devices. In this way, the storage testing devices test the storage array by generating a similar heat and power output profile to what real storage devices would produce. The storage testing device includes sensors to measure temperature and power load to return to the storage controller. Using this measured temperature and power data, the storage controller models how the storage array and storage controller respond to the thermal and power levels that would occur during normal operations without having to utilize expensive storage devices, such as enterprise level SSDs.

In further embodiments, the storage testing device may include an I/O bus interface, such as a Peripheral Component Interconnect Express (PCIe®) switch, to receive I/O from the storage controller to determine if there are any communication errors, such as link level errors. However, because, in certain implementations, the storage testing device does not include storage elements, such as NAND cells, the transmitted data is not stored. (PCIe is a registered trademark of PCI-SIG).

In yet further embodiments, multiple storage array slots may be loaded with storage testing devices to test how the storage array operates fully or partially loaded with the storage testing devices which simulate the heat and power output produced by the combination of real storage devices having storage media. Further, subjecting the storage array 102 to thermal loads from the testing devices 200, 300 causes the storage controller 100 to increase or decrease fan speeds and control other temperature control devices to test the cooling and temperature control subsystems in the storage controller.

Figure 1:
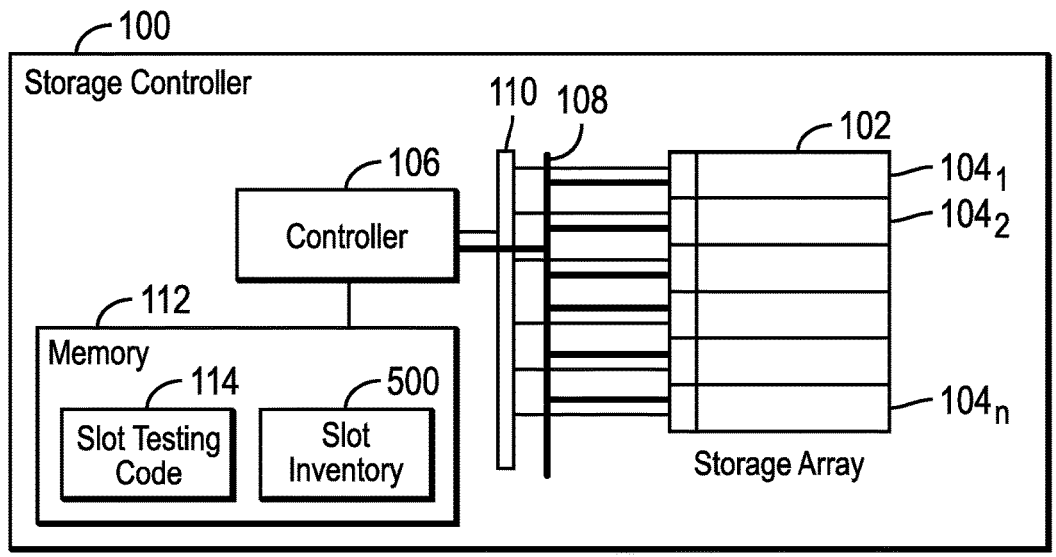
FIG. 1 illustrates an embodiment of a storage controller and storage array in which embodiments are implemented.

FIG. 1 illustrates an embodiment of storage controller 100 managing access to a storage array 102, such as an array of Solid State Drives (SSDs), positioned in slots $104_1$, $104_2$ ... $104_n$ of the storage array 102. The storage controller 100 includes a controller 106 to manage I/O operations in the storage controller 100. An I/O bus interface 108 allows the controller 106 to transmit I/O requests to the storage devices in the storage array 102, such as a PCIe® bus or other high speed I/O bus interfaces. The controller 106 may communicate configuration commands to devices in the slots $104_1$, $104_2$ ... $104_n$ over a system management interface 110, such as a low-speed communication bus.

The storage controller 100 includes a memory 112, such as a volatile memory device, including slot testing code 114 executed by the controller 106 to run testing sequences on storage testing devices, which emulate storage devices such as SSDs, in the slots $104_1$, $104_2$ ... $104_n$. The memory 112 further stores a slot inventory 800 having testing information on the storage devices engaged in the slots $104_1$, $104_2$ ... $104_n$.

Although FIG. 1 shows one controller 106, the storage controller 100 may include multiple controllers that are independently capable of running the slot testing code 114 to perform testing operations with respect to the storage array 102.

The slot testing code 114 may comprise program code loaded into the controller 106 and executed by the controller 106. Alternatively, some or all of the functions may be implemented as microcode or firmware in hardware devices in the storage controller 100, such as in Application Specific Integrated Circuits (ASICs).

Figure 2:
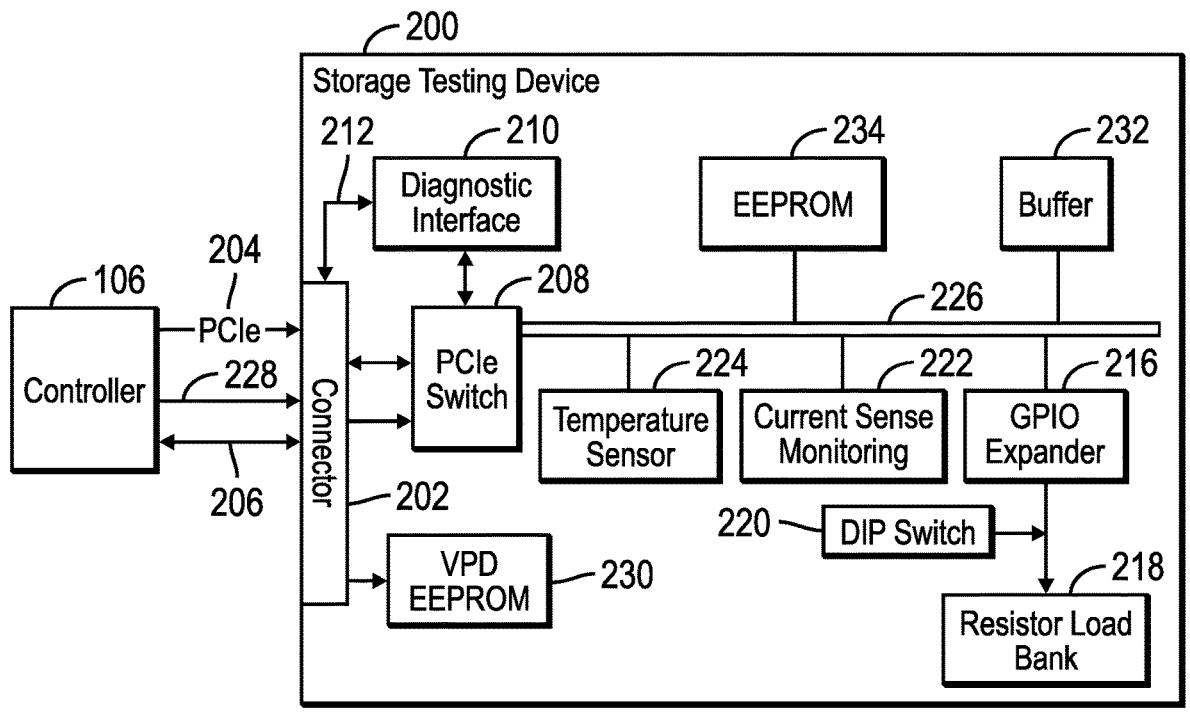
FIGS. 2 and 3 illustrate embodiments of a storage testing device.

FIG. 2 illustrates an embodiment of a storage testing device 200 that may be positioned in one of the slots $104_1$, $104_2$ ... $104_n$ to emulate a storage device for testing purposes. The storage testing device 200 includes a connector 202 to connect to an I/O bus 204, such as PCIe bus, and connect to a system management interface bus 206. PCIe switch 208 receives I/O requests over the PCIe bus 204. However, because the storage testing device 200, which simulates a storage drive, may not include storage elements for storing I/O data, the data is not stored. Debug, or diagnostic, interface 210 connected to the PCIe switch 208 gather information on communication errors experienced over the PCIe bus 204, such as link errors, packet errors, validation error and I/O bit rate errors. The diagnostic interface 210 may comprise a JTAG Universal Asynchronous Receiver/Transmitter (UART) bidirectional interface that has a test access port to gather debugging information from the PCIe switch 208, such as information on link errors, I/O data errors, etc. The controller 106 may retrieve debugging information on link and packet errors from the diagnostic interface 210 over interface 212, which may comprise the UART interface.

Various components may communicate with the PCIe switch 208 on a low-speed bus 226, including a General Purpose Input/Output (GPIO) expander 216 that receives controller 106 commands to adjust the resistor load bank 218 settings to control the output watts or thermal load and power outputted from the resistor load bank 218. The storage testing device 200 circuit board may include a dual in-line package (DIP) switch 220 comprising a manual electric switches grouped together that an operator may selectively toggle to different combined settings corresponding to different output watt levels from the resistor load bank 218 to control the thermal and power load produced by the resistor load bank 218 that dissipates throughout the storage testing device 200 housing. For instance, the lowest watt output from the resistor load bank 218 may be 7 watts and highest watt level 35 watts.

A current sense monitoring sensor 222 may determine a power load in the storage testing device 200 measured in watts, resulting from the resistor load bank 218, and a temperature sensor 224 may detect a temperature of the storage testing device 200. The sense monitoring sensor 222 and temperature sensor 224 may transmit their measurements over the low speed bus 226, such as a system management interface, through the bus 206 back to the controller 106. Bus interface 228 may be used for sideband signals to the PCIe switch 208 and may be used to read the Vital Product Data (VPD) electrically erasable programmable read-only memory (EEPROM) 230, which is typically used with solid state drives (SSDs). The vital product data that is read may comprise collection of configuration and informational data associated with a particular set of hardware or software, such as part numbers, serial numbers, and engineering change levels. With the VPD EEPROM 230, the storage testing device 200 may simulate an SSD device by maintaining SSD vital product data to present itself as an SSD without SSD storage capabilities. The VPD EEPROM 230 may store additional simulated product data in buffer 232. The EEPROM 234 may receive over the bus 226 the measurements from the sensors 222 and 224 and store in the EEPROM 234. The controller 106 may then read the stored sensed data from the sensors 222 and 224 that are stored in the EEPROM 234.

With the described embodiments, the controller 106 gathers information from the components 222, 224, 230, 234 over a low speed bus, such as the system management interface bus 110, 206 and 226. The controller 106 may send I/O traffic over the PCIe bus 204 to have the PCIe switch 208 process the I/O packets to determine link level errors, error rate testing, etc. However, because, in certain embodiments, the storage testing device 200 does not have any SSD storage elements it does not store the sent data, and only processes the packets to have the diagnostic interface 210 perform error testing on the PCIe transmissions. In this way the storage testing device 200 simulates the SSD operations during testing to load test how the storage controller and storage array 102 handle thermal loads generated by numerous testing storage devices, e.g., SSDs, producing heat and power in the slots $104_1$, $104_2$ ... $104_n$. The storage testing device 200 is significantly less expensive to manufacture than the cost of SSDs because there are no NAND storage elements, just components to simulate the thermal and power load produced by an SSD, or other storage device.

Figure 3:
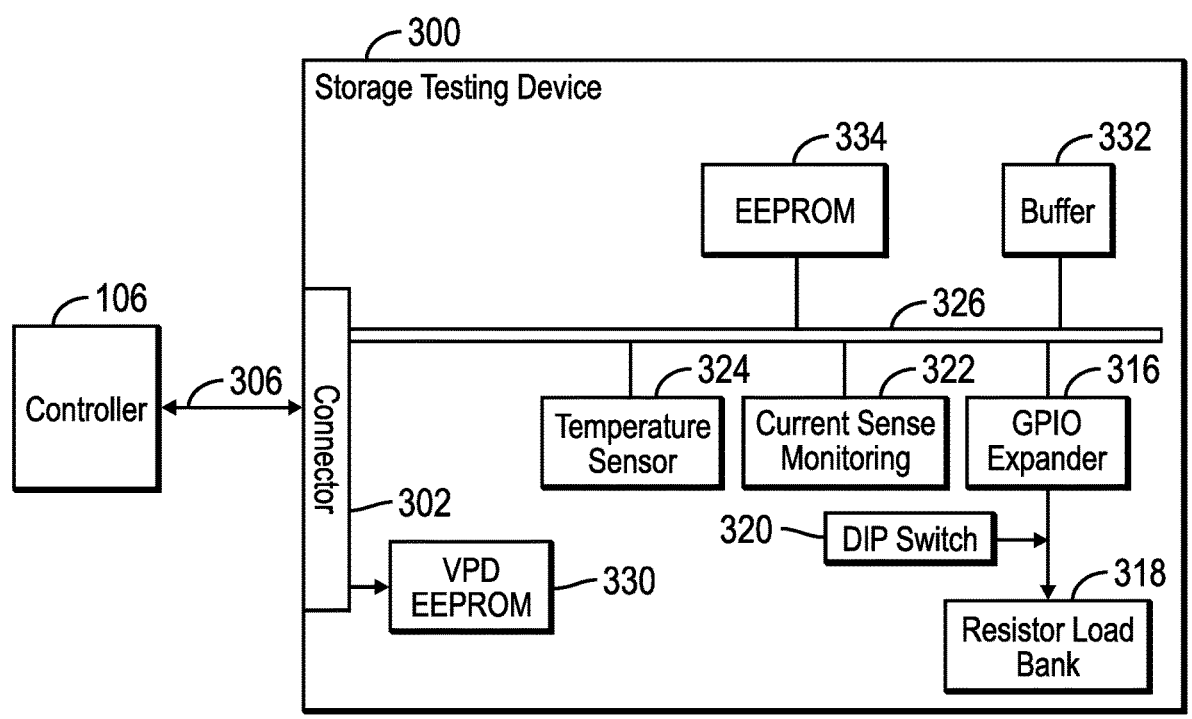

FIG. 3 illustrates an alternative embodiment of a storage testing device 300 as not including the PCIe switch 208, diagnostic interface 210 and related hardware to provide a lower cost version of the storage testing device 200. The storage testing device 300 includes components 302, 306, 316, 318, 320, 322, 324, 326, 330, 332, 334 that correspond to components 202, 206, 216, 218, 220, 222, 224, 226, 230, 232, 234 in FIG. 2. The storage testing device 300 cannot test I/O communication from the controller 106 because it does not have a PCIe switch 208. Thus, the controller 106 would not send I/O load to the storage testing device 300 because there is no PCIe or I/O bus connection. However, the controller 106 can gather temperature and power information from the sensors 322 and 324 on the storage testing device 300 card. A combination of storage testing devices 200 and 300 may be included in the slots $104_1$, $104_2$ ... $104_n$ of the storage array 102 for testing.

The storage testing devices 200 and 300 may be implemented as printed circuit boards that are included in a housing that can fit in the slots $104_1$, $104_2$ ... $104_n$. The storage testing devices 200 and 300 are substantially less expensive than enterprise SSD devices and can be deployed in storage arrays having 40 or more slots. Because the cost of the storage testing devices 200, 300 are substantially less than the cost of SSDs, the cost to test all the slots filled with storage testing devices 200, 300 is substantially less than testing with SSD drives. Further, the storage testing devices 200, 300 will not experience wear leveling and last longer than testing with SSD drives that may have a shorter duration due to wear leveling in the NAND storage elements from the heavy I/O testing load.

Figure 4A:
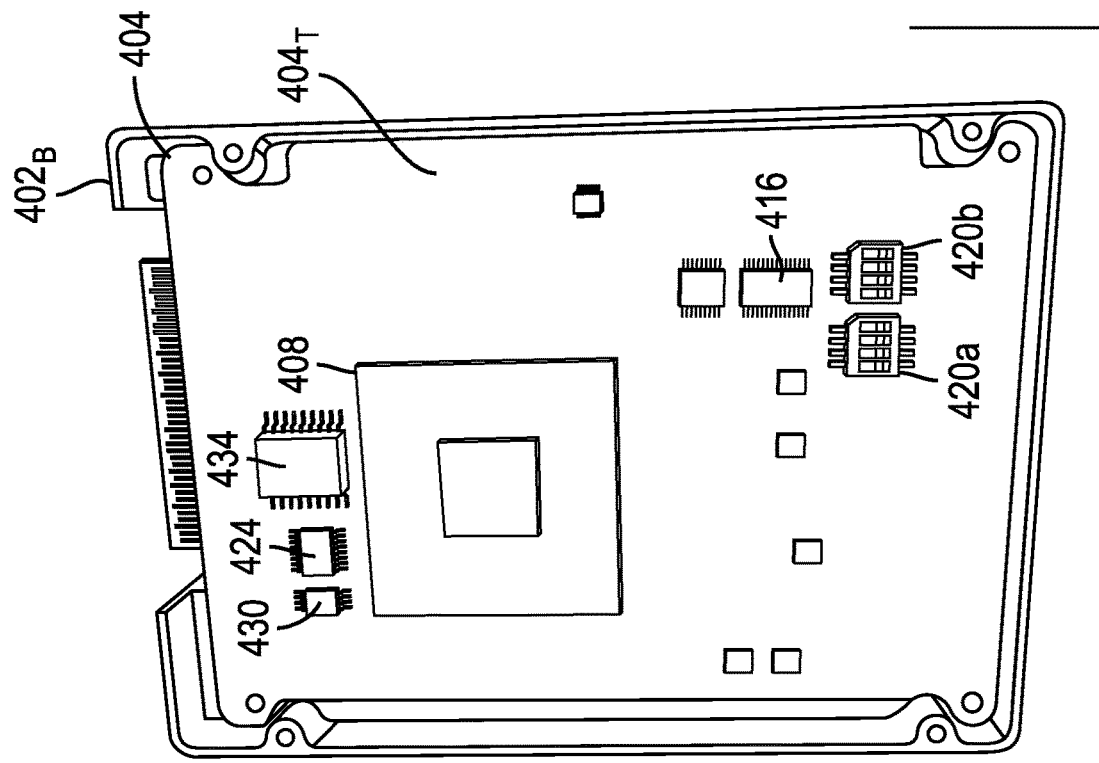
FIGS. 4a and 4b illustrate an embodiment of a housing and circuit board of a storage testing device.
Figure 4A:
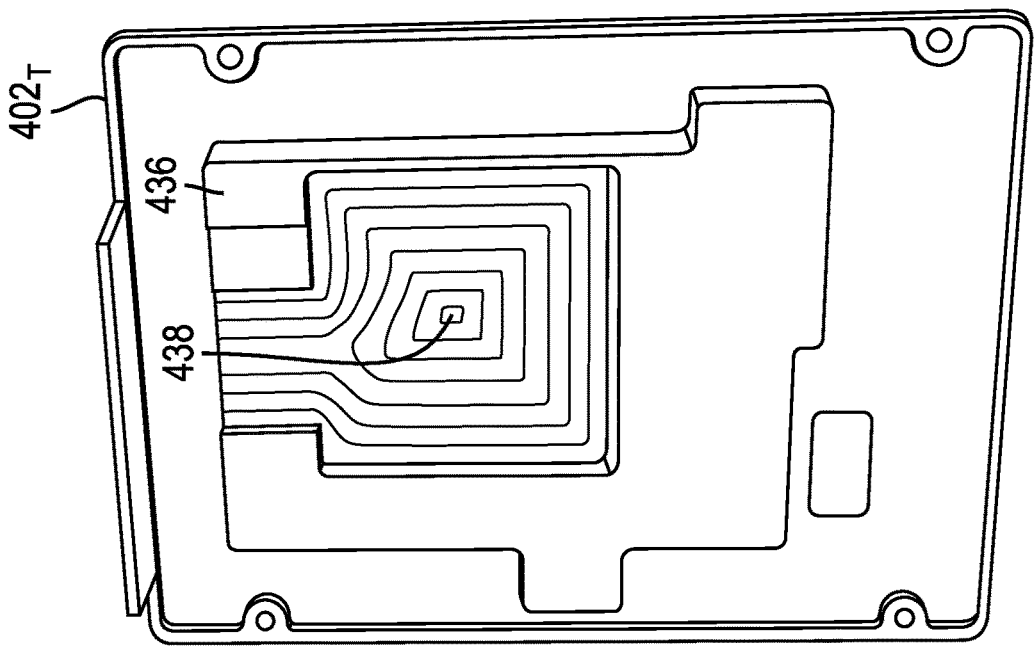

FIG. 4a shows a top housing 402T and bottom housing 402B of the storage testing device 400, a top side 404T of the circuit board 404 attached to the bottom housing 402B. FIB. 4b shows the bottom side 404B of the circuit board 400. The circuit board 404 may comprise the storage testing devices 200 and 300 shown in FIGS. 2 and 3, respectively. FIG. 4a shows the circuit board 404 as the storage testing device 200 having the PCIe switch 408. The top 404T and bottom 404B of the circuit board 404 further includes PCIe switch 408, GPIO expander 416, DIP switches 420a, 420b, current sense monitoring sensor 422, temperature sensor 424, VPD EEPROM 430, buffer 432, and EEPROM 434, as described with respect to components 208, 216, 220a, 220b, 222, 224, 230, 232, and 234 in FIG. 2, respectively.

Figure 4B:
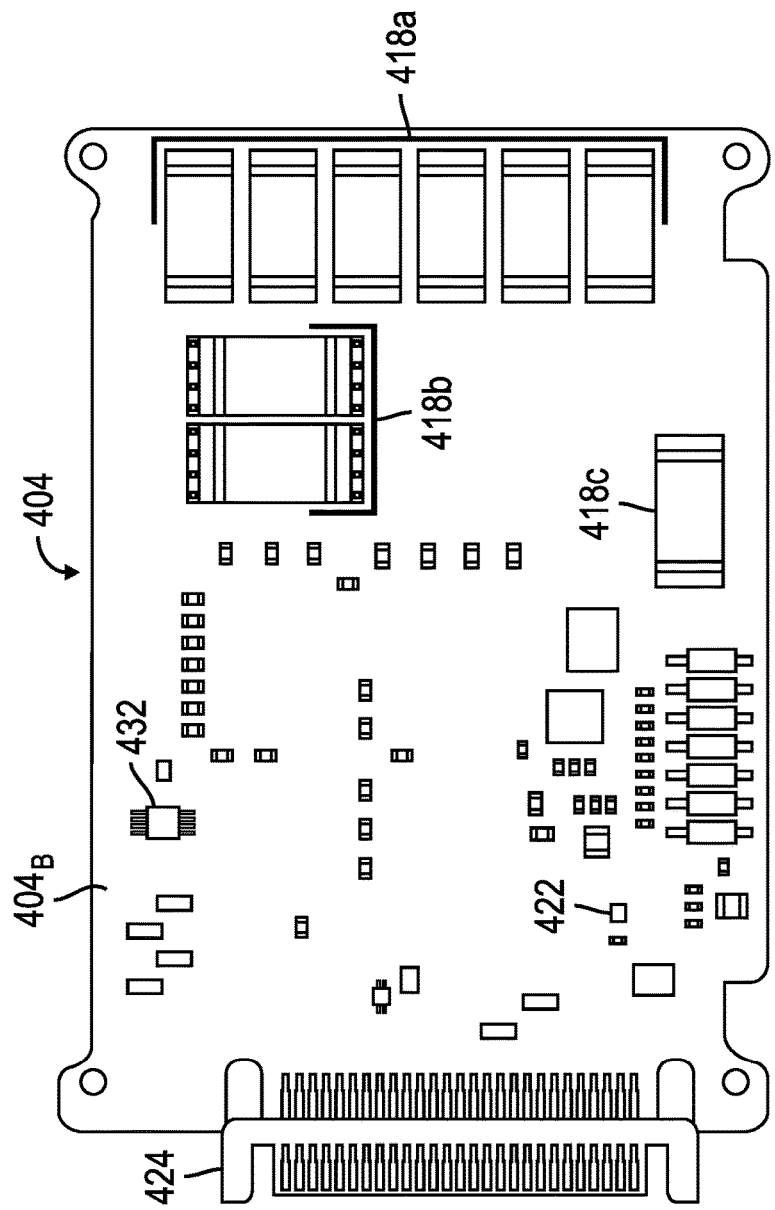

The top housing 402T includes a metal block 436 to conduct the thermal load and power outputted by the resistor load banks 418a, 418b, 418c (FIG. 4b). The metal block 436 (FIG. 4a) includes a recessed portion 438 in which the PCIe switch 408 is positioned when the top housing 402T and bottom housing 402B are coupled together. In certain embodiments, the PCIe switch 408 may contact the recessed portion 420 when the top housing 402T and bottom housing 402B are coupled to transfer heat to the PCIe switch 408 to simulate deployed operations where the PCIe switch 406 may be exposed to heightened thermal loads. The metal block 436 may comprise a thermally conductive alloy such as aluminum.

The resistor load banks 418a, 418b, 418c produce the thermal load and power load on the bottom side 404B of the circuit board 404 that are conducted by the metal block 436 on the top side 404T of the circuit board 404 when the top housing 402T and the bottom housing 402B are coupled.

The testing storage device described with respect to FIGS. 2, 3, 4a and 4b simulate a thermal and power load of a storage device, such as an SSD, in a storage array slot $104_i$ to use when testing the storage array 102 and storage controller 100 components. During testing, the slots $104_1$, $104_2$ . . . $104_n$ of the storage array 102 may be filled with testing storage devices, as described with respect to FIGS. 4a and 4b, that have fewer components and no NAND storage banks of an SSD drive and, thus, substantially less expensive than an SSD drive. The storage testing device operates by generating thermal load and power load through the resistor load banks 418a, 418b, 418c on the bottom side 404B of the circuit board 404 and as conducted through the metal block 436 attached to the top housing 402T.

Figure 5:
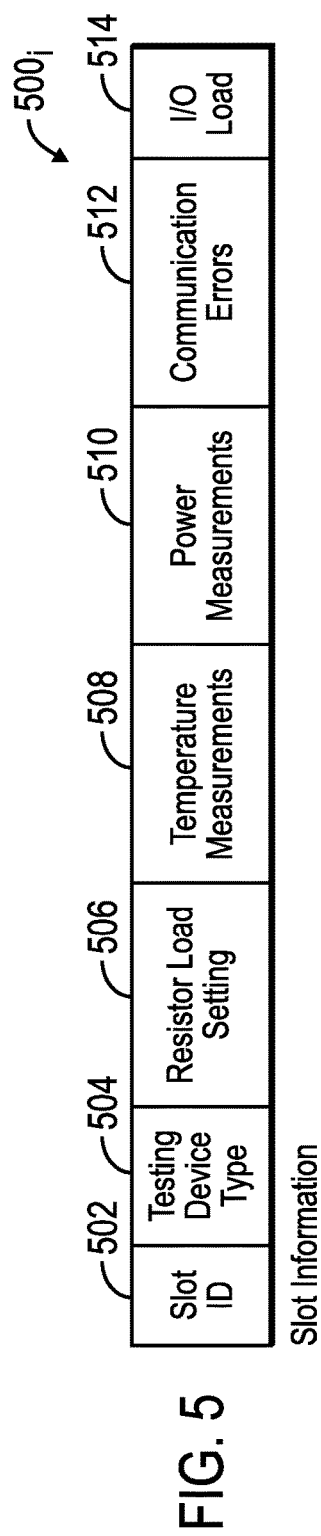
FIG. 5 illustrates an embodiment of slot information having information on a storage testing device in a slot of a storage array.

FIG. 5 illustrates an embodiment of a slot information $500_i$ in the slot inventory 500 for a storage testing device 200, 300 in slot $104_i$, and includes: a slot identifier (ID) 502 identifying a slot $104_i$ in the storage array 102; a testing device type 504, such as a storage testing device 200 having a PCIe switch 208 or a storage testing device 300 that does not include a PCIe switch; a resistor load setting 506 or thermal load level, e.g., number of watts to output, communicated from the controller 106 to the GPIO expander 216, 316, 416 or a thermal load level manually set on the DIP switch 220, 320, 420a, 420b; temperature measurements 508 gathered over time by the temperature sensor 224, 324, 424 from the EEPROM 234, 334 434; power measurements 510 gathered over time by the current sense monitoring sensor 222, 322, 422 from the EEPROM 234, 334, 434; communication errors 512 gathered over time from the diagnostic interface 210, 310, such as link level errors on the PCIe bus 204, bit level errors, validation errors, encoding errors, etc.; and the I/O load 514 the controller 106 outputs to the slot 502 over time. The storage testing device 300 of FIG. 3 may not be able to gather communication and link level errors.

Figure 6:
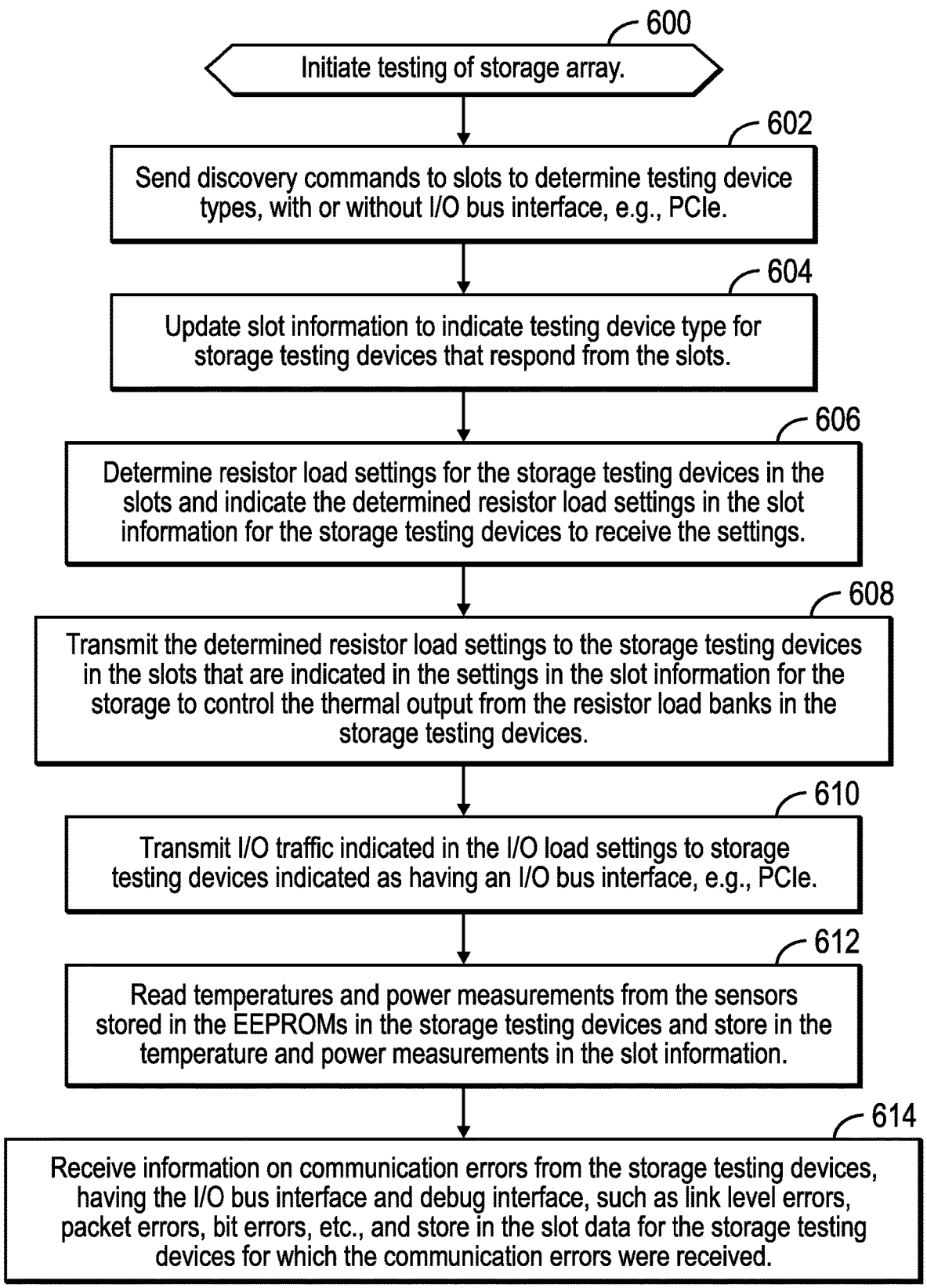
FIG. 6 illustrates an embodiment of operations performed by a storage controller to configure and use storage testing devices in slots of a storage array to test the storage array and storage controller.

FIG. 6 illustrates an embodiment of operations coded in the slot testing code 114 and executed by the controller 106 to configure the storage testing devices 200, 300 connected in the slots $104_1, 104_2 \ldots 104_n$ to perform load testing of the storage array 102 and storage controller 100. Upon initiating (at block 600) testing, the controller 106 sends (at block 602) discovery commands to the slots $104_1, 104_2 \ldots 104n$ to determine testing device type 200 or 300, such as which storage testing devices in the slots $104_1, 104_2 \ldots 104_n$ have PCIe switches 208. The slot information $500_i$ is updated (at block 604) to indicate testing device type 504 for storage testing devices 200, 300 that respond from the slots $104_1$, $104_2 \ldots 104_n$. The controller 106 may determine (at block 606) resistor load settings 506 for the storage testing devices in the slots and indicates the determined resistor load settings 506 in the slot information $500_i$ to send to the storage testing devices 200, 300 to program their resistor load banks 218, 318. The slot testing code 114 may provide a schedule of different resistor load settings for the storage testing devices in the slots $104_1, 104_2 \ldots 104_n$ and modify those settings over time according to the testing schedule. For instance, the slot testing code 114 may increase the resistor load settings to higher wattage during times of higher I/O load traffic and decrease resistor load settings to lower wattage during times of lower I/O load traffic to model thermal load that occurs during different levels of I/O activity to the slots $104_1, 104_2 \ldots 104_n$. In this way, the thermal load applied to the testing devices 200, 300 in the slots $104_1, 104_2 \ldots 104_n$ can be dynamically adjusted. Further, the controller 106 may assign different thermal loads, or resistor levels, to different slots $104_1, 104_2 \ldots 104_n$, for the testing devices 200, 300 to operate at different thermal load/resistor levels.

The controller 106 transmits (at block 608) the determined resistor load settings to the storage testing devices 200, 300 in the slots $104_1, 104_2 \ldots 104_n$ that are indicated in settings 506 in the slot information $500_i$ to control the thermal output from the resistor load banks 218, 318 in the storage testing devices 200, 300. Alternatively, the resistor levels can be manually set through the DIP switches 220, 320. In such case, the operations at blocks 606 and 608 would not be performed and the resistor load at the resistor load bank 218, 318 is determined by the DIP switch 220, 320 settings. The resistor load setting indicated in the DIP switch 220, 320 settings may be indicated in the resistor load setting 506 in the slot information $500_i$. The controller 106 may send a command to the GPIO expander 216, 316 to determine DIP switch 220, 320 settings for the resistor load setting to use.

The controller 106 transmits (at block 610) I/O traffic indicated in the I/O load settings 514 to the storage testing devices 200 indicated as having a device type 504 with an I/O bus interface, e.g., PCIe switch 208, 308. The controller 106 periodically reads (at block 612) temperatures and power measurements from the sensors 222, 322, 224, 324 stored in the EEPROMs 234, 334 in the storage testing devices 200, 300. The read measurements are stored in the measured temperatures 508 and measured power 510 in the slot information 500j. The controller 106 further receives (at block 614) information on communication errors from the diagnostic interface 210 and the PCIe switch 208 in the storage testing devices 200 having the I/O (PCIe) bus interface, such as link level errors, packet errors, bit errors, etc., and stores the received communication errors 512 in the slot information $500_i$ for the storage testing devices 200 providing information on communication errors.

With the embodiment of FIG. 6, the storage controller 100 may program the testing storage devices in the slots $104_1$, $104_2 \ldots 104_n$ to control how they output thermal load to simulate how real storage devices, such as SSDs, produce thermal load during operations. The storage controller 100 may gather measured temperatures and power output from the storage devices 200, 300 in the slots $104_1, 104_2 \ldots 104_n$ and determine whether the introduction of such thermal load results in errors or failures in the storage array 102. Further, the storage controller 100 may generate I/O traffic to the testing storage devices having a PCIe switch to determine communication errors, such as link level errors. In this way, testing storage devices 200, 300, substantially less expensive than actual SSD storage devices, may be used to test the storage controller 100 and storage array 102 during development to determine whether the storage controller 100 will function properly when deployed to customers.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation or garbage collection, but this does not render the storage device as transitory because the data is not transitory while it is stored.

Figure 7:
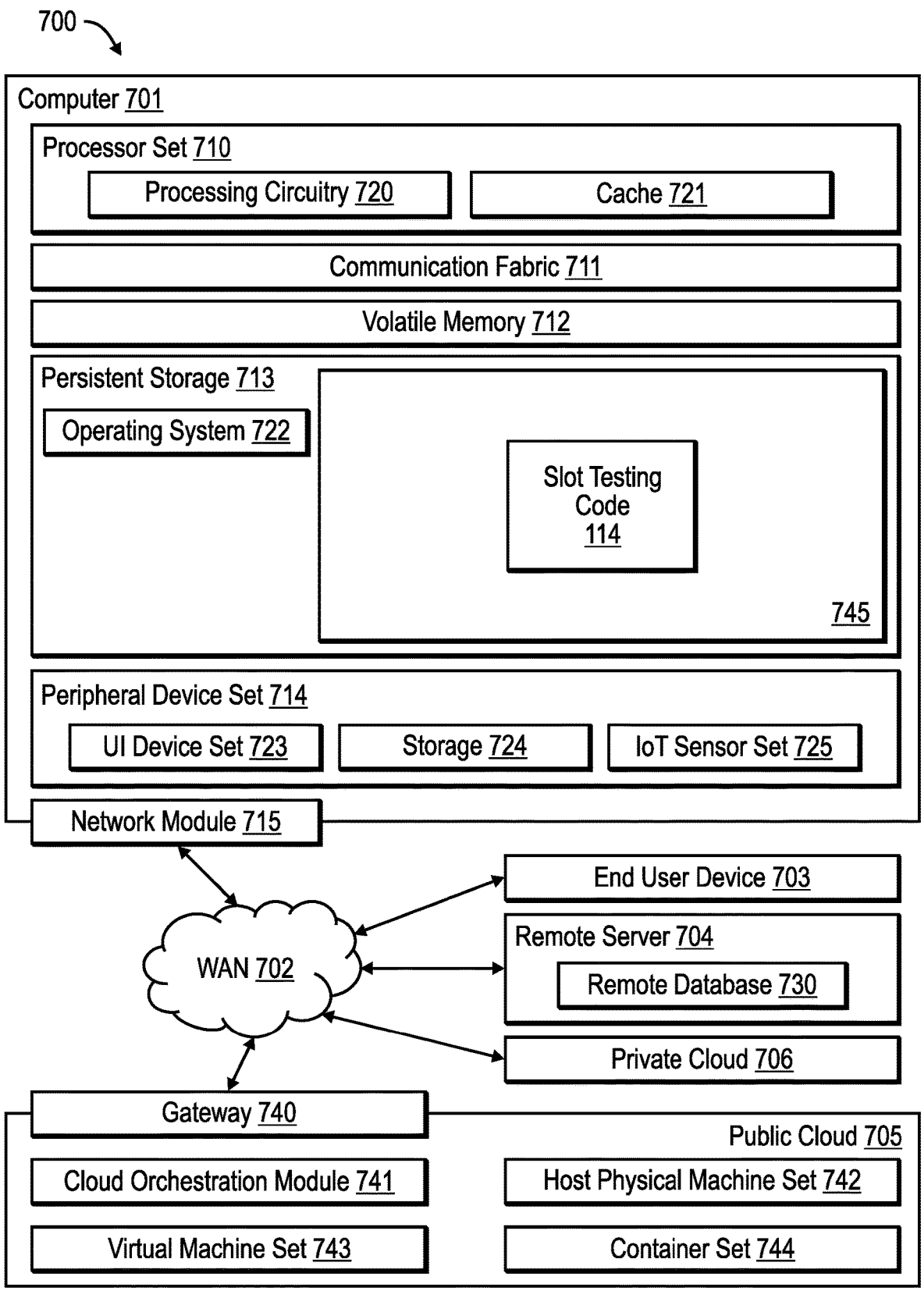
FIG. 7 illustrates a computing environment in which the components of FIG. 1 may be implemented.

In FIG. 7, computing environment 700 contains an example of an environment for the execution of at least some of the computer code involved in performing the inventive methods, including configuring storage testing devices in a storage array to simulate storage devices to test how the storage controller and storage array operate during I/O operations.

The computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 701, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 77 to control and direct performance of the inventive methods. In computing environment 700, at least some of the instructions for performing the inventive methods may be stored in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The slot testing code 114 includes at least some of the computer code involved in performing the inventive methods, including, but not limited to, configuring storage testing devices in the storage array.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. In certain embodiments, the peripheral devices may comprise the storage testing devices 200, 300.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704. In certain embodiments, the slot inventory may be implemented in the database 730. The database 730 may comprise the slot inventor 500 in FIG. 1.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

It will be appreciated that terms such as "front," "back," "top," "bottom," "left," "right." "above," and "side" used herein are merely for ease of description and refer to the orientation of the components as shown in the figures. It should be understood that any orientation of the components described herein is within the scope of the present invention.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A storage testing device to fit into a slot of a storage system, wherein the storage system includes a controller, comprising:
    a resistor load bank to generate a thermal load during operation when the storage testing device is positioned in the slot, wherein, when generated, the thermal load is transferred to the slot;
    a temperature sensor to measure a temperature at the storage testing device from the thermal load outputted from the resistor load bank and to transmit the measured temperature to the controller over a bus interface; and
    a current sense monitor to measure a power load at the storage testing device from output from the resistor load bank and to transmit the measured power load to the controller over the bus interface, wherein the controller is external to the storage testing device.

2. The storage testing device of claim 1, further comprising:
a metal plate to transfer thermal load from the resistor load bank to the slot in which the storage testing device is positioned.

3. The storage testing device of claim 1, wherein the resistor load bank comprises a first resistor load bank on a first side of a circuit board, further comprising:
a second resistor load bank on a second side of the circuit board to generate a thermal load during operation when the storage testing device is positioned in the slot, wherein, when generated, the thermal load from the second resistor load bank are transferred to the slot.

4. The storage testing device of claim 1, further comprising:
a bus interface switch to receive Input/Output requests from the controller and to determine link level errors on the bus interface with the controller, wherein the bus interface switch communicates information on the determined link level errors to the controller.

5. The storage testing device of claim 4, wherein the bus interface switch comprises a PCIe switch and the bus interface comprises a PCIe bus.

6. The storage testing device of claim 4, further comprising:
a storage management interface to receive control signals from the controller to control the resistor load bank.

7. The storage testing device of claim 1, further comprising:
a dual in-line package (DIP) switch coupled to the resister load bank, wherein different combinations of switch positions on the DIP switch correspond to different energy loads outputted by the resistor load bank.

8. The storage testing device of claim 1, further comprising:
an expander for receiving commands from the controller corresponding to different thermal loads outputted by the resistor load bank, wherein the expander controls the thermal load outputted by the resister load bank in response to the commands from the controller.

9. A system having a controller, including:
a bus interface;
a storage array having a plurality of slots;
a plurality of storage testing devices positioned in the slots, wherein a storage testing device of the plurality of storage testing devices comprises:
a resistor load bank to generate a thermal load during operation when the storage testing device is positioned in a slot, wherein, when generated, the thermal load is transferred to the slot;
a temperature sensor to measure a temperature at the storage testing device from the thermal load outputted from the resistor load bank and to transmit the measured temperature to the controller over the bus interface; and
a current sense monitor to measure a power load at the storage testing device from output from the resistor load bank and to transmit the measured power load to the controller over the bus interface, wherein the controller is external to the storage testing device.

10. The system of claim 9, wherein each of the storage testing devices includes:
a metal plate to transfer thermal load from the resistor load bank to one of the slots in which a storage testing device is positioned.

11. The system of claim 9, wherein at least one of the storage testing devices includes:
a bus interface switch to receive Input/Output requests from the controller and to determine link level errors on a bus interface with the controller, wherein the bus interface switch communicates information on the determined link level errors to the controller.

12. The system of claim 9, wherein each of the storage testing devices includes:
an expander for receiving commands from the controller corresponding to different thermal loads outputted by the resistor load bank, wherein the expander controls the thermal load outputted by the resister load bank in response to the commands from the controller.

13. The system of claim 9, wherein the resistor load bank comprises a first resistor load bank on a first side of a circuit board, wherein at least one of the storage testing devices includes:
a second resistor load bank on a second side of the circuit board to generate a thermal load during operation when the storage testing device is positioned in a slot of the storage array, wherein, when generated, the thermal load from the second resistor load bank are transferred to the slot.

14. A method for testing a storage system having a controller, comprising:
positioning a storage testing device into a slot of the storage system;
generating, by a resistor load bank in the storage testing device, a thermal load during operation when the storage testing device is positioned in the slot, wherein, when generated, the thermal load is transferred to the slot;
measuring, by a temperature sensor, a temperature at the storage testing device from the thermal load outputted from the resistor load bank;
transmitting, by the temperature sensor, the measured temperature to the controller over a bus interface;
measuring, by a current sense monitor, a power load at the storage testing device from output from the resistor load bank; and
transmitting, by the current sense monitor, the measured power load to the controller over the bus interface, wherein the controller is external to the storage testing device.

15. The method of claim 14, further comprising:
transferring, by a metal plate in the storage testing device, thermal load from the resistor load bank to the slot in which the storage testing device is positioned.

16. The method of claim 14, further comprising:
receiving, on a bus interface switch, Input/Output requests from the controller;
determining link level errors on a bus interface with the controller; and
communicating, via the bus interface switch, information on the determined link level errors to the controller.

17. The method of claim 14, further comprising:
receiving, over a storage management interface, control signals from the controller to control the resistor load bank.

18. The method of claim 14, further comprising:
receiving, by an expander, commands from the controller corresponding to different thermal loads outputted by the resistor load bank; and
controlling, by the expander, the thermal load outputted by the resister load bank in response to the commands from the controller.

19. The method of claim 14, wherein the resistor load bank comprises a first resistor load bank on a first side of a circuit board, further comprising:

generating, by a second resistor load bank on a second side of the circuit board, a thermal load during operation when the storage testing device is positioned in a slot of the storage system, wherein, when generated, the thermal load from the second resistor load bank are transferred to the slot.

\* \* \* \* \*